Patented Aug. 10, 1943

2,326,619

UNITED STATES PATENT OFFICE 2,326,619

VACUUM PAN

Jose R. Carreras, San Juan, P. R., assignor to sucesores de Abarca, San Juan, P. R., a partnership consisting of Angel Abarca Portilla, Juan Abarca Portilla and Felipe F. Vidal Application January 11, 1940, Serial No. 313,431

8 Claims. (Cl. 159—27)

This invention relates to vacuum pans and more particularly to vacuum pans used in the production of sugar and it is an object of this invention to provide a vacuum pan of improved construction in which the ratio of the initial charge to the final volume of the strike is reduced and in which the ratio of the heating surface to the initial charge is increased. It is also an object of this invention to provide a vacuum pan with means which serves to reduce the capacity of the heating section of the pan during the initial stages of the strike and which may be adjusted to restore the full capacity of the heating section and to serve as a baffle determining the path of the circulating currents during the subsequent boiling. It is also an object of this invention to provide a method of using a vacuum pan of the type described.

Figure 1:
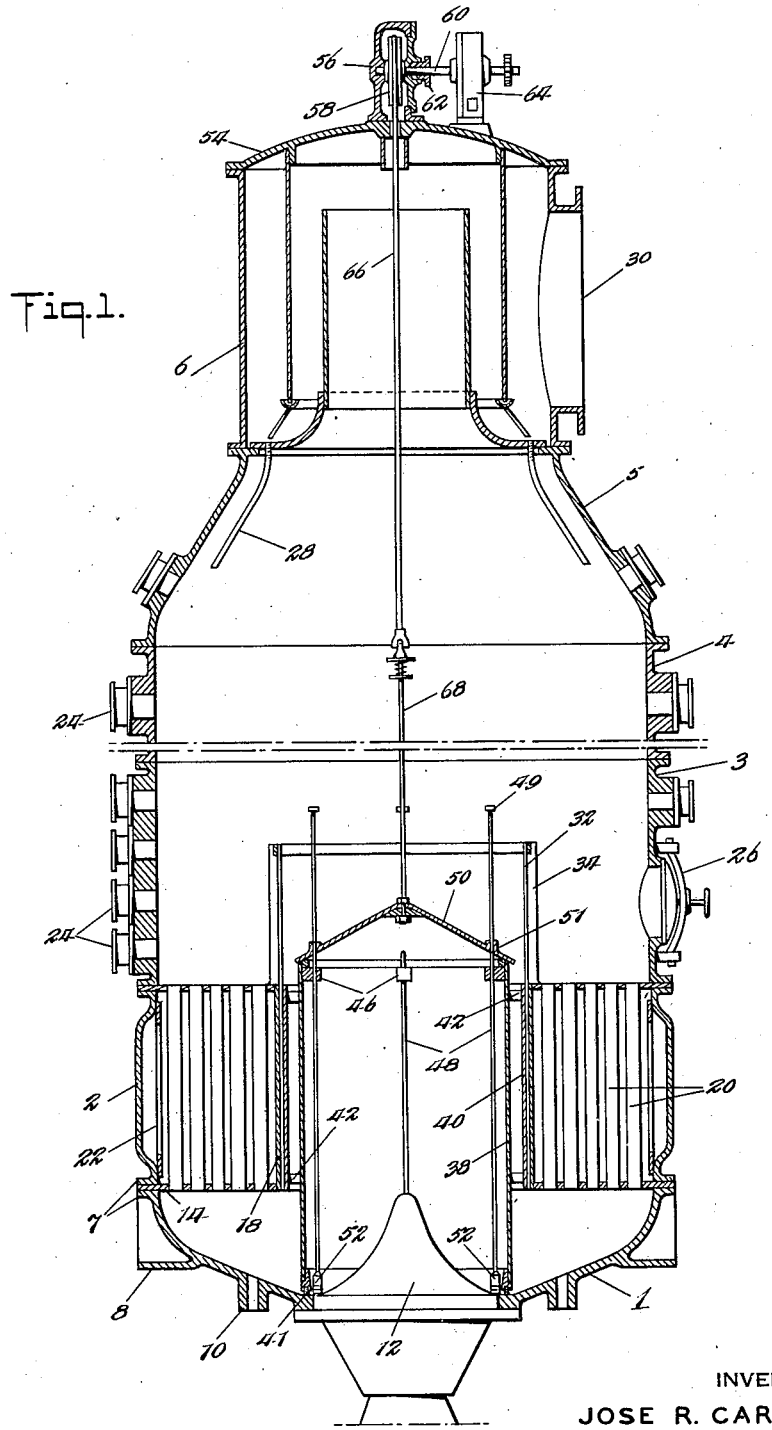
Figure 1 is a central vertical sectional view of a vacuum pan constructed in accordance with this invention with the means shown in position to reduce the capacity of the heating section.

In the drawings in which only sufficient of a vacuum pan is shown to illustrate the application of this invention thereto there is shown a vacuum pan comprising a bottom section 1, a heating or calandria section 2, cylindrical liquor belts 3 and 4, a converging dome belt 5 and an entrainment separator section 6, the various sections being flanged, as at 7, to receive bolts (not shown) by which the sections are secured together. The bottom 1 is formed with brackets 8 by which the pan is mounted upon suitable supports (not shown) and is provided with filling openings 10 and a central discharge opening which may be controlled by a discharge valve 12 of the construction shown in the co-pending application of Carreras and Lugo, Serial No. 274,058, filed May 16th, 1939.

The heating or calandria section 2 comprises an annular heating space formed by the wall of the section 2, a bottom plate 14 and a top plate 16 welded or otherwise secured to the flanges of the section 2 and a tubular member 18 secured to the inner edges of the plates 14 and 16. Tubes 20 secured in the plates 14 and 16 by expanding or welding provide passage through the heating section 2 so the pan contents may be heated by steam supplied to the heating section through a passage 22.

The sections 3, 4 and 5 are provided with the usual sight glasses 24 while the section 3 is also provided with a man-hole 26. The entrainment separator section 6 shown is of usual construction providing repeated reversals of the flow of the vapors driven off from the pan contents so that most of the liquid entrained with the vapor is separated and returned to the pan through the return pipes 28 while the vapors are discharged through the outlet 30 to a condenser (not shown).

Slidably mounted within the tubular member 18 and guided by rods 32 secured to the inner face of the member 18 and to a frame 34 mounted on the top plate 16 is a displacing duct 36 which comprises an inner tubular member 38 and an outer tubular member 40 secured together by spacing blocks 42, the member 40 being of such diameter as to be slidably guided by the rods 32. The member 38 has secured at its lower edge a ring 39 in which is mounted a suitable gasket or packing 41 which will form a liquid tight seal when the member 38 is engaged with the bottom section 1. The member 38 is of such length that when engaged with the bottom 1 it will project above the top plate 16 and above the level to which the pan is filled by an initial charge while the member 40 is of such length and so positioned on the member 38 that when the member 38 engages the bottom 1 the member 40 extends from the top plate 16 to the bottom plate 14 of the heating section 2.

The upper edge of the member 38 is re-enforced by a ring 44 and secured to the ring 44 are blocks or brackets 46 having openings through which pass rods 48. To close the upper end of the member 38 there is provided a top or cap 50 which is formed with bosses 51 having openings to receive the rods 48. The rods 48 have flat enlarged heads 49 at their upper ends which retain the top 50 on the rods and at their lower ends have blocks 52 attached thereto which prevent the rods 48 being withdrawn from the blocks 46 and through their engagement with the blocks 46 serve to lift the displacing duct 36.

To provide for raising and lowering the displacing duct 36 the top 54 of the separator section 6 is fitted with a housing 56 in which a sheave 58 is mounted on a shaft 60 which projects through a packing gland 62. The shaft 60 is driven through gearing 64 from a motor (not shown) to rotate the sheave 58 in one direction or the other. The motor may be controlled manually or automatically stopped at the limit of its operation in each direction by means of the usual limit switches. Secured to the sheave 58 is an end of the cable 66, the other end of which is connected to an end of a rod 68 the other end of which is connected to the cap 50.

With the tubular member 38 in engagement with the bottom 1, as shown in Figure 1, the initial charge of syrup, molasses or any sort of seeding is introduced into the pan through the openings 10 or other openings and fills the bottom 1; the tubes 20 of the heating section 2 and the space between the members 38 and 40 of the displacing duct 36 but the space within the member 38 will not be filled. The initial charge must be sufficient to fill the pan to the usual level, which is slightly above the top plate 16, so with the displacing duct 36 in position the charge required to fill the pan to the usual level will be much less than the charge where there is no displacing duct. Or, if desired, an initial charge of the usual volume can be used if the height of the heating section 2 and the displacing duct 36 be increased accordingly. During the boiling of the initial charge the syrup or material being treated passes upwardly through the tubes 20 and downwardly through the annular space between the tubular members 38 and 40 of the displacement duct 36, the member 40 being, as shown in Figure 1, of such length and so positioned that it does not interfere with the usual circulation of the charged material. The cover 50 is fitted to make a reasonably tight joint with the member 38 and prevents the charged material being boiled into the displacing duct 36.

Figure 2:
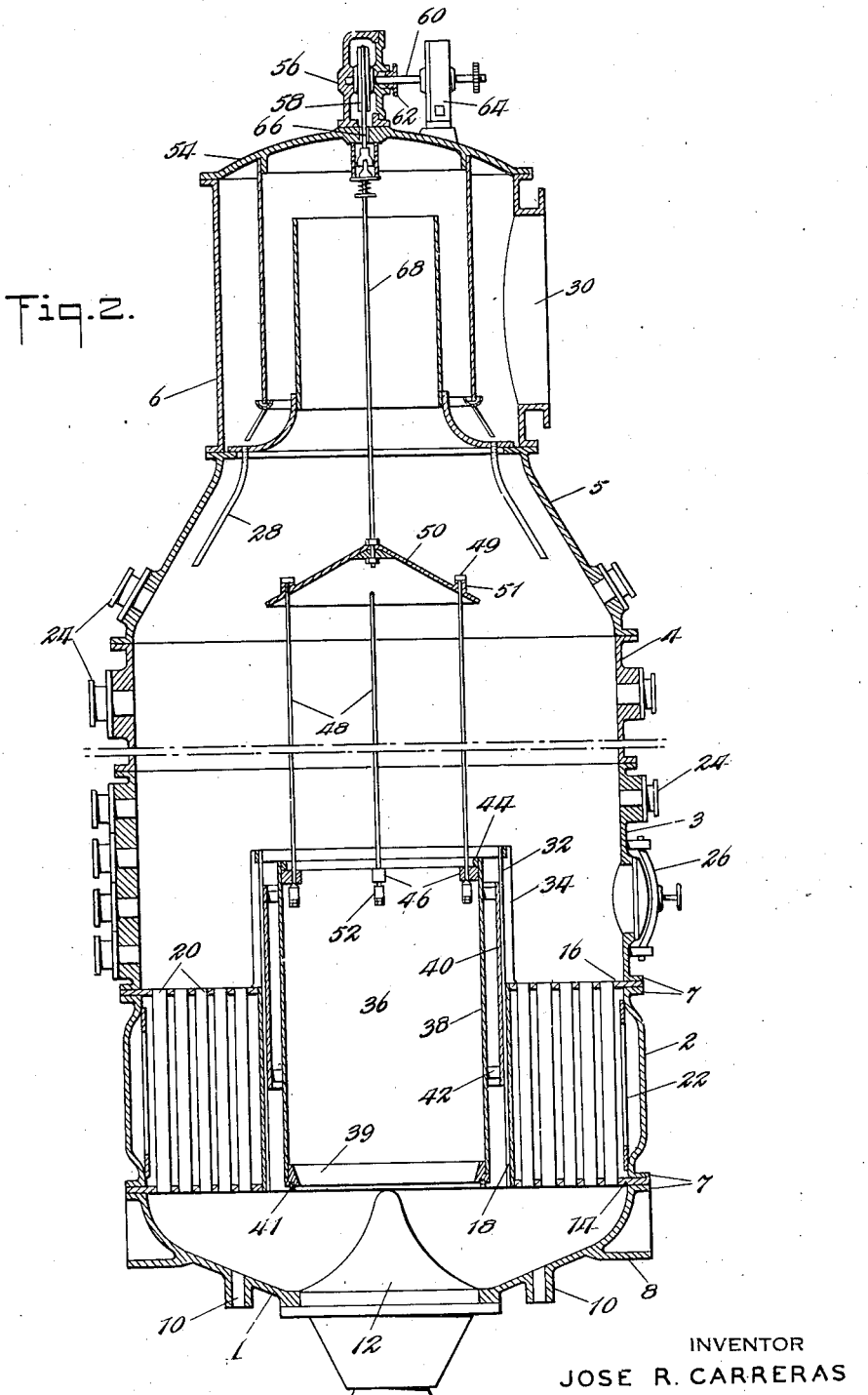
Figure 2 is a view similar to Figure 1 with the means raised to increase the length of the path through which the heated pan contents circulate and to restore the capacity of the heating section.
Figure 3:
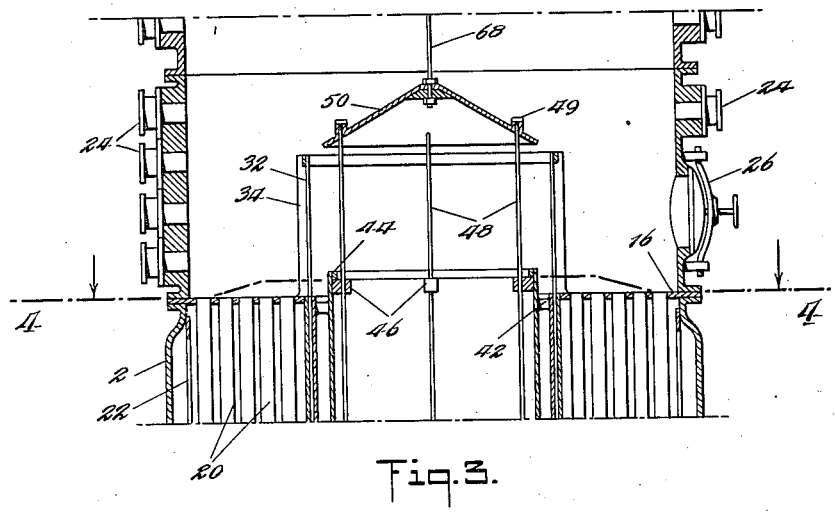
Figure 3 is a partial view similar to Figure 1 with the charge limiting means partially raised.
Figure 4:
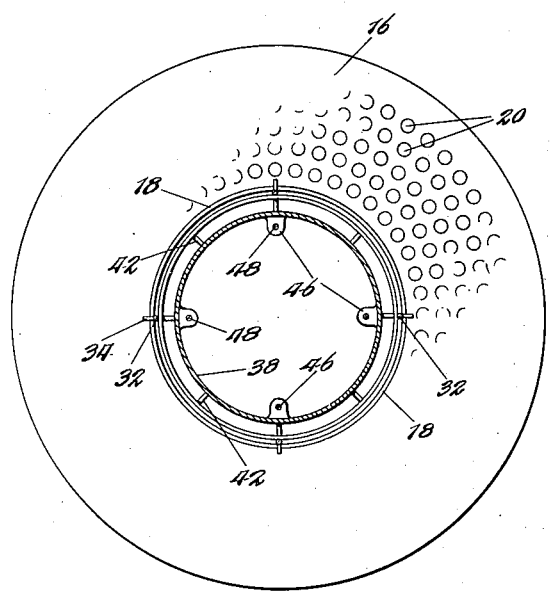
Figure 4 is a transverse sectional view taken as on line 4—4 of Figure 3.

The boiling of the initial charge is continued and additional material supplied to the pan until the charge is sufficient, were the displacing duct 36 raised, to just cover the top plate 16 of the heating section, whereupon the cap 50 is raised, permitting the material to flow into the displacing duct 36. The raising of the cap 50 is continued until the blocks 52 on the rods 48 engage the member 38 and raise the duct 36. The raising of the duct 36 may be continuous until it is raised to its extreme upper position as shown in Figure 2 or it may be raised step by step as material is fed to fully charge the pan. With the pan fully or partially charged and the duct 36 in its raised position the duct 36 serves as a baffle preventing the circulating currents of the charged material from passing directly from the top of the heating section 2 to the return passage in the tubular member 18 and forcing the circulating currents to pass more nearly to the top of the charge in the pan before entering the return passage in the duct 36 thus ensuring a proper circulation of the charged material during the boiling. Where the duct 36 is raised step by step as the material is fed to the pan a proper circulation of the charged material is insured at this time.

The duct 36, once raised, is retained in its raised position until the boiling is completed and upon the discharge of the contents of the pan the duct 36 is returned to its position in engagement with the bottom 1 and the cap 50 to its position on the duct 36. The use of the duct 36 to lessen the capacity of the heating section 2 at the time of the initial charge reduces the volume of the initial charge and the ratio of the initial charge to the final volume of the strike and also the ratio of the volume of the initial charge to the heating surface of the heating section. Where the height of heating surface is increased so that an initial charge of the usual volume is used the increase thus secured in the heating surface reduces the ratio of the volume of the initial charge thereto below the usual ratio. With the crystals formed in the initial charge in the pan by any of the usual methods and the subsequent control of the pan properly conducted until the treatment of the strike is completed the final size of the grain or crystals depends upon the original size and number of crystals in the initial charge and the final volume to which the strike may be carried with reasonable good circulation for best crystal growth and without production of new crystals.

In present designs of calandria vacuum pans with natural circulation the volume of the minimum initial charge which can be used is limited by the height of the calandria which must be fully covered by the initial charge before heat is applied thereto. The final volume of the strike for calandria vacuum pans with natural circulation depends upon existing conditions at the pan used but the general practice is to carry the final level for the strike to within six or seven feet above the upper tube sheet of the calandria. The ratio of the initial charge to the final volume of the strike is thus limited to above 30%. By decreasing the initial charge volume by use of the means above described the ratio may be made much lower and further crystal growth beyond that now obtainable can be secured. The maximum heating surface given to a calandria vacuum pan with natural circulation is generally limited by the height which must be given to the calandria belt so that the volume of the initial charge will not exceed a convenient percentage of the final strike volume. Where the use of the usual ratio of initial charge volume to final strike volume gives a crystal size which is satisfactory and there is no desire to develop the size of the crystal further, the means above described permits of a higher calandria belt being used with an initial charge of the usual volume, thus adding heating surface to the calandria and giving a higher ratio of heating surface to final strike volume than is now available.

What is claimed is:

1. In a vacuum pan, a heating section, a centrally positioned tubular member for lessening the capacity of said section, means for seating said tubular member on said pan, a cap on said member, said cap and pan preventing flow to said member and means for raising said cap and member different distances to restore the capacity of said section.

2. In a vacuum pan, a bottom section, a heating section secured to said bottom section, a tubular member centrally positioned in said heating section and seated on said bottom section, a cap engaging said member, said cap and said bottom section preventing flow of liquid to said member and means for raising said cap and member different distances to permit circulation of liquid through said member.

3. In a vacuum pan, a bottom section, a heating section secured to said bottom section, a centrally positioned tubular member engaging said bottom section and projecting above the top of said heating section, said tubular member lessening the capacity of said heating section, a cap preventing flow of liquid into said tubular member, and means for elevating said cap and member and separating said cap from said member to restore the capacity of said heating section.

4. In a vacuum pan, a heating section, said pan and heating section being constructed and arranged to provide a circulation of the pan contents, a tubular member in said heating section and means for shifting said tubular member to seat on said pan for reducing the capacity of said heating section during initial boiling stages of the pan and to raise said tubular member to serve as a baffle to circulating currents during subsequent boiling stages as the pan is being fed.

5. In a vacuum pan, a bottom section, a heating section, a tubular member in said heating section engaging said bottom section and projecting above said heating section and means for shifting said tubular member to vary the capacity of said heating section between a lessened capacity during initial charging of the pan when said member engages said bottom section and full capacity on subsequent charging of said pan, said tubular member serving as a baffle to circulating currents as the pan is being fed on the later stages.

6. In a vacuum pan, a heating section, a tubular member in said heating section, said tubular member being open at both ends, means for sealing said tubular member to lessen the capacity of said heating section and means for opening said tubular member while said heating section is in operation for varying the capacity of said heating section.

7. In a vacuum pan, a heating section, a movable tubular member extending through said section, said tubular member being open at both ends, means sealing said tubular member in one position thereof and lessening the capacity of said heating section and means for shifting said member in said heating section and relatively shifting said member and sealing means to restore the capacity of said heating section.

8. In a vacuum pan, a heating section, a centrally positioned tubular member open at both ends and movable in said heating section, means for sealing said tubular member at the ends thereof and lessening the capacity of said heating section in the lowest position of said tubular member and means for raising said member from said position and relatively shifting said member and sealing means for opening said member to restore the capacity of said heating section.

JOSE R. CARRERAS.